US008782332B2

(12) United States Patent
Chen et al.

(10) Patent No.: US 8,782,332 B2
(45) Date of Patent: Jul. 15, 2014

(54) CONTROL METHOD AND CONTROLLER FOR DRAM

(75) Inventors: Chung-Ching Chen, Hsinchu (TW); Hsian-Feng Liu, Hsinchu (TW); Yu-Lin Chen, Hsinchu (TW)

(73) Assignee: MStar Semiconductor, Inc., Hsinchu (TW)

( * ) Notice: Subject to any disclaimer, the term of this patent is extended or adjusted under 35 U.S.C. 154(b) by 636 days.

(21) Appl. No.: 13/167,889

(22) Filed: Jun. 24, 2011

(65) Prior Publication Data

US 2012/0226852 A1 Sep. 6, 2012

(30) Foreign Application Priority Data

Mar. 3, 2011 (TW) ............................ 100107201 A

(51) Int. Cl.
*G06F 12/00* (2006.01)

(52) U.S. Cl.
CPC ..................................... *G06F 12/00* (2013.01)
USPC ............ 711/105; 711/E12.002; 711/E12.007; 711/E12.078

(58) Field of Classification Search
None
See application file for complete search history.

(56) References Cited

U.S. PATENT DOCUMENTS 5,677,901 A * 10/1997 Iwamura .................... 369/47.31
5,729,515 A * 3/1998 Inagawa et al. ............ 369/47.33
RE35,921 E * 10/1998 Harlin et al. ............. 365/189.14
5,852,586 A * 12/1998 Fujita ........................... 365/193
6,216,128 B1 * 4/2001 Di-Crescenzo et al. .............. 1/1
6,381,659 B2 * 4/2002 Proch et al. ...................... 710/57
6,430,680 B1 * 8/2002 Burky et al. .................. 712/225
7,505,478 B2 * 3/2009 Mazuz et al. ................. 370/429
7,793,085 B2 * 9/2010 Furuya .......................... 712/237
2001/0054121 A1 * 12/2001 Proch et al. ...................... 710/57
2005/0235167 A1 * 10/2005 Tiotantra et al. .............. 713/300
2008/0288741 A1 * 11/2008 Lee et al. ...................... 711/200
2009/0052286 A1 * 2/2009 Yamada et al. ............ 369/30.27
2009/0201925 A1 * 8/2009 Rhim et al. ................... 370/389
2010/0104013 A1 * 4/2010 Matsumoto et al. ..... 375/240.15

OTHER PUBLICATIONS

Webopedia, "Dynamic RAM", Sep. 1, 1996, pp. 1-2, https://web.archive.org/web/20010405223253/http://www.webopedia.com/TERM/D/dynamic_RAM.html.*

* cited by examiner

*Primary Examiner* — Charles Rones
*Assistant Examiner* — Christopher Birkhimer
(74) *Attorney, Agent, or Firm* — WPAT, PC; Justin King

(57) ABSTRACT

A DRAM controller including a judging module, a determination module, and a transmission module is provided. The judging module judges an address content difference between a first command and a third command. The determination module determines a plurality of buffering address contents, associated with at least one second command, according to the address content difference. The transmission module then sequentially transmits the first command, the at least one second command, and the third command to the DRAM.

20 Claims, 3 Drawing Sheets

S11
Judging address content difference between first command and third command

S12
Determining buffering address of second command according to address content difference S13
Transmitting first command, second command and third command in sequence to DRAM

CONTROL METHOD AND CONTROLLER FOR DRAM

FIELD OF THE INVENTION

The present invention relates to a dynamic random access memory (DRAM), and more particularly, to a method for arranging a sequence of control commands of a DRAM.

BACKGROUND OF THE INVENTION

A DRAM has advantages of being low in cost, simple in structure, and high in density within unit area, and is thus commonly applied in various consumer electronic products, e.g., a master memory of a personal computer. An electronic device usually reads data from or writes data to a DRAM via a memory controller. For example, to read data from a DRAM, a memory controller first sends an ACTIVE command, specifying a predetermined row address, for asking the DRAM to load a content of the predetermined row to a memory bank. The memory controller then sends a READ command, specifying a memory bank address and a column address, for acquiring the data temporarily stored in the predetermined column of the predetermined memory bank.

To optimize operation performance, in general, the memory controller consecutively sends a plurality of commands to the DRAM. However, noise interference resulted from the differences between the commands on signal lines are not considered in the prior memory controller when sending the commands to the DRAM. For example, supposing that the memory controller consecutively sends two read commands to the DRAM, with address contents of the two commands respectively being hexadecimal 0x0000 and 0xffff. Therefore, when the memory controller switches a signal at its address output end from 0x0000 to 0xffff, noises occur at signal lines for transmitting the address content due to 16 concurrent toggles. The greater the noise is, the more severe interference is imposed on a content of an original signal, and even cause the DRAM at the other end of the signal lines to misjudge contents of the commands.

Despite the trend of increasing both operation efficiency and data amount of electronic devices, the above interference becomes more drastic along with increase of clock speed and number of signal lines. The interference may be lowered by adopting a multi-layer printed circuit board, which however significantly increases overall hardware cost of the electronic device, and is thus an unsatisfactory solution.

SUMMARY OF THE INVENTION

Therefore, the object of the present invention is to provide a control method and controller for a DRAM. Through an appropriate arrangement of command contents and command sequence transmitted to a DRAM, the method and controller of the present invention is capable of reducing the number of concurrent toggles on a signal line to lower corresponding noise interference. Hence, an electronic device implementing the method and controller of the present invention is capable of lowering noise when the electronic device operates at a higher speed without increasing shields of a printed circuit board.

According to an embodiment of the present invention, a control method for a DRAM is provided. The method comprises judging an address content difference between a first command and a third command, determining a plurality of buffering address contents, associated with at least one second command, and sequentially transmitting the first command, the at least one second command and the third command to the DRAM. The first command and the third command are respectively a first-type command, and the at least one second command is a second-type command.

According to another embodiment of the present invention, a control method for a DRAM is provided. The method comprises identifying whether an address content difference between a first command and a second command is greater than a predetermined threshold, determining a plurality of buffering address contents, associated with at least one second command, according to the address content difference, and sequentially transmitting the first command, the at least one second command and the third command to the DRAM. The first command and the third command are respectively a first-type command, and the second command is a second-type command.

Compared to the prior art, the control method and controller for a DRAM provide advantages of effectively reducing noise and cost.

BRIEF DESCRIPTION OF THE DRAWINGS

The above objects and advantages of the present invention will become more readily apparent to those ordinarily skilled in the art after reviewing the following detailed description and accompanying drawings, in which.

DETAILED DESCRIPTION OF PREFERRED EMBODIMENTS

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

According to address contents, commands transmitted from a memory controller to a DRAM are generally divided into two types. A first-type command comprises more address information, inferring that an address column in the first-type command has a higher utilization rate. For example, an ACTIVE command requesting a DRAM to load a content of a predetermined row to a memory bank includes an address of the predetermined row, and is thus a first-type command. A WRITE command and a READ command respectively include addresses for specifying a predetermined memory bank and a column, and are thus first-type commands. Furthermore, a module register set (MRS) command is also regarded as a first-type command. In contrast, a second-type command comprises less address information or no address information at all. For example, a no operation (NOP) command, a PRECHARGE command for releasing an activated predetermined row in a predetermined memory bank, and a REFRESH command for asking a DRAM to update all stored contents, are second-type commands.

In a control method and a controller for a memory according to an embodiment of the present invention, at least a second-type command can be interposed between two first-type commands, acting as a buffer. By appropriately re-arranging contents and a sequence of commands transmitted to a DRAM, the control method and the controller for a memory according to the present invention are capable of effectively reducing the number of concurrent toggles occurring on signal lines to reduce corresponding noise interference.

Figure 1:
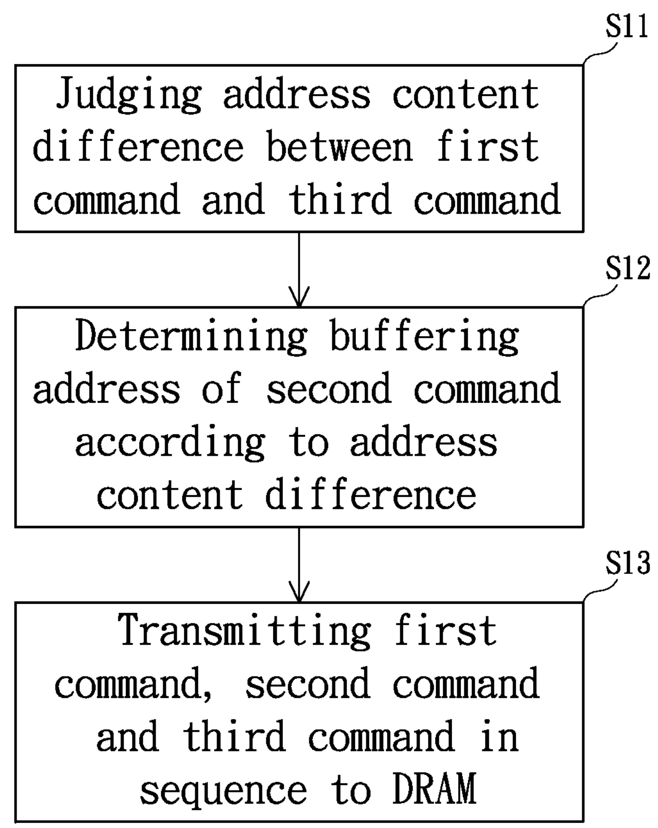
FIG. 1 is a flowchart of a control method according to an embodiment of the present invention.

FIG. 1 shows a flowchart of a control method according to an embodiment of the present invention. Suppose a first command and a third command transmitted from a control end to a DRAM are both first-type commands, comprising more address information. For example, the first command is a WRITE command and the third command is an ACTIVE command. As shown in FIG. 1, the method begins with Step S11 to judge an address content difference between the first command and the third command. For example, if the address contents of the first command and the third command are hexadecimal 0x0000 and 0xffff, respectively, the address content difference obtained in Step S11 is hexadecimal 0xffff.

Subsequently, in Step S12, a buffering address content of a second command is determined according to the address content difference (i.e. 0xffff). For example, the second command is a PRECHARGE command. In practice, the PRECHARGE command only utilizes few bits in its address column to assign an address of a memory bank to be precharged. After receiving a PRECHARGE command, the DRAM usually reads only the address content for assigning the memory bank, and ignores contents of other address columns in the PRECHARGE command. In this embodiment, a content, acting as a buffer, can be filled into the address columns ignored by the DRAM. For example, supposing that an address content of the second command is originally hexadecimal 0x3000, wherein the last three digits 000 (corresponding to 12 bits) represent column addresses to be ignored. In Step S12, the address content of the second command may be modified to 0x30ff, as the buffering address content. In Step S13, the first command, the second command and the third command are sequentially transmitted to the DRAM.

As an example, suppose the address column contents of the first, second and third commands are respectively hexadecimal 0x0000, 0x30ff and 0xffff. If the first and third commands are transmitted in sequence, noise resulted from 16 concurrent toggles occurs on signal lines transmitting the address contents when the memory controller switches a signal at its output end from 0x0000 to 0xffff. According to the above embodiment of the present invention, the signal on the signal lines for transmitting the address contents first switches from 0x0000 to 0x30ff, causing only 10 toggles. The address signal then switches from 0x30ff to 0xffff, causing only 6 toggles. It is concluded that the number of concurrent toggles occurred during each command switching is less after the second command is interposed between the first and third commands than that when directly transmitting the first and third commands in sequence.

Take another example where another READ command (which also belongs to the foregoing first-type command) is to be transmitted at the control end after the third command, and the address column content of the read address is 0x000f. According to the control method in FIG. 1, a second-type command, e.g., a NOP command, is interposed between the third command and the READ command by the control end and an address column content of the NOP command is designated to be 0xf00f according to an address content difference between the two commands, i.e. the third command and the READ command. Thus, a signal on the signal lines for transmitting an address content is switched from 0xffff to 0xf00f, and then from 0xf00f to 0x000f. The numbers of the concurrent toggles resulted from the two switchings are 8 and 4 respectively, which are both less than the 12 toggles occurred when directly switching the address signal from 0xffff to 0x000f.

It is to be noted that, since the last three digits of 0x3xff in the second command are not considered by the DRAM, modifying the address content of the second command to 0x30ff causes no effects in controlling the DRAM. Similarly, the address column content of the above NOP command is not considered by the DRAM, so that modifying the address column content to 0xf00f causes no effects in controlling the DRAM, either.

From the previous two examples, the commands transmitted from the control end to the DRAM are sequentially the READ command, the PRECHARGE command, the ACTIVE command, the NOP command, and the READ command, whose contents are respectively 0x0000, 0x30ff, 0xffff, 0xf00f, and 0x000f. It is observed that, between every two first-type commands at least a second-type command comprising an appropriate address column content for providing a buffering effect is interposed. With the control method of the present invention, the number of concurrent toggles occurring on signal lines is reduced to lower correspondingly noise interference. Therefore, an electronic device implementing the present invention is capable of operating at higher speeds without increasing shields of printed circuit boards to lower noise. In practice, the commands transmitted to the DRAM and the address contents are not limited in the examples described above.

In other embodiments of the present invention, apart from the address content difference between the first command and the third command, a configuration of signal lines associated with the DRAM may also serve as a reference for determining the buffering address contents. For example, before determining the contents of which address columns are to be modified, physical distances and neighboring relationships between the address signal lines are taken into consideration to prevent toggles simultaneously occurring at two neighboring signal lines, so as to further lower noise interference resulted by coupling of the signal lines. Moreover, since a power line (including a ground line) provides a certain signal isolating effect, noise caused by simultaneously changing voltages of address signal lines at the opposite sides of a power line is also less than that without a power line in between. Therefore, a configuration of power lines on a printed circuit board or in a chip may also serve as a reference when determining the buffering address contents.

Figure 2:
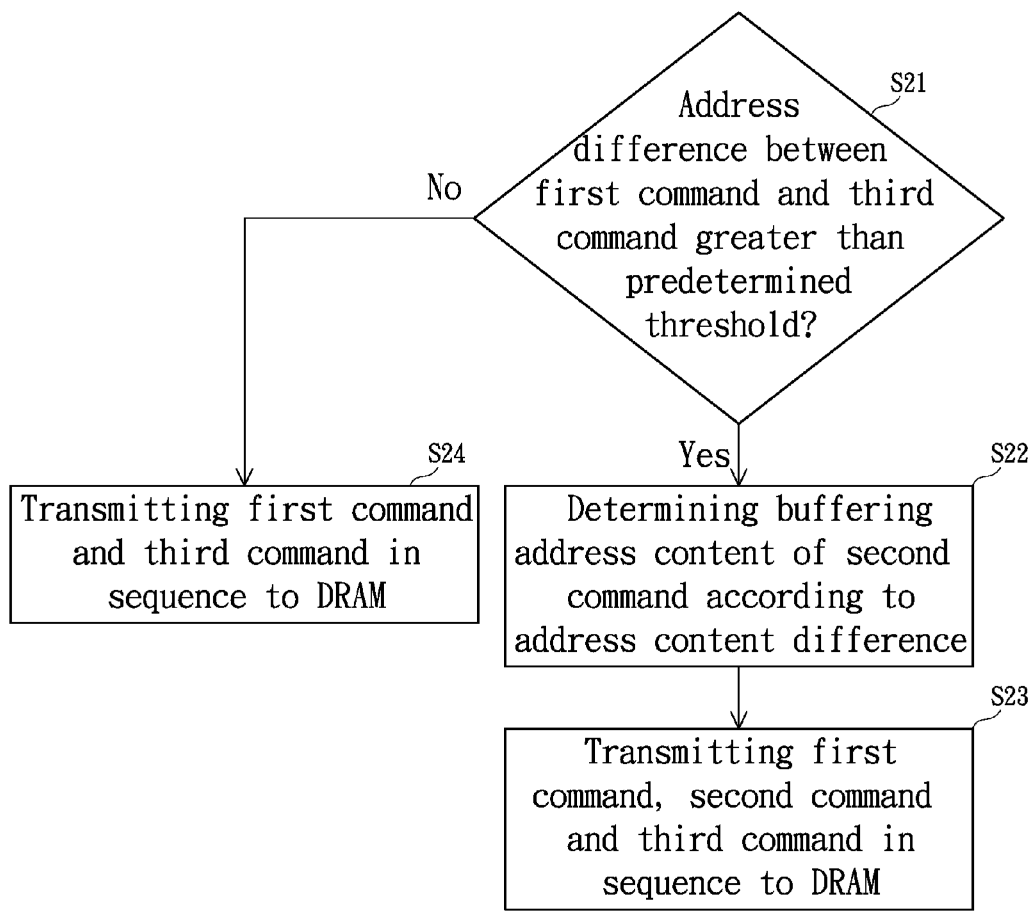
FIG. 2 is a flowchart of a control method according to another embodiment of the present invention.

FIG. 2 shows a flowchart of a control method according to another embodiment of the present invention. The method begins with Step S21 to identify whether an address content difference between a first command and a third command, to be sequentially transmitted to a DRAM, is greater than a predetermined threshold. When a determination result of Step S21 is affirmative, Step S22 is performed to determine a buffering address content of a second command. In Step S23, the first command, the second command and the third command are sequentially transmitted to the DRAM. Conversely, when the result from Step S21 is negative, Step S24 is performed to directly transmit the first command and the third command to the DRAM in sequence.

A main difference between the embodiments respectively shown in FIG. 1 and FIG. 2 is that, the interposing of the second command is optional in the embodiment shown in FIG. 2. In the event that the address content difference between the two first-type commands (i.e., the first and third commands) is rather insignificant, that is to say, an excessive number of toggles are unlikely to be caused by directly transmitting the two commands in sequence. Consequently, the interposing of a second-type command between the two first-type commands is not an absolutely necessary step. For example, in Step S21, a determination condition may be whether the number of toggles corresponding to the address content difference is greater than 8, or directly determining whether the address content difference is greater than a predetermined hexadecimal number, and thereby effectively controlling the number of toggles. Similar to the embodiment in FIG. 1, in the embodiment in FIG. 2, a configuration of signal lines associated with the DRAM or a configuration of power lines may also serve as a reference for determining the buffering address content in Step S22.

Please note that some constraints have to be put on a control method for rearranging contents and sequence of commands transmitted to a DRAM, according to the present invention. While moving forward a subsequent second-type command to be interlaced with first-type commands, the control method must assure that the rearranged command sequence also comply with the specification of DRAM, such as the maximum time interval limitation of the REFRESH command. In addition, while moving forward a PRECHARGE command, which releases a specific activated row of a designated memory bank, the control method must assure that the PRECHARGE command cannot be moved to any place ahead of a WRITE command or a READ command operated on the same memory bank.

Figure 3:
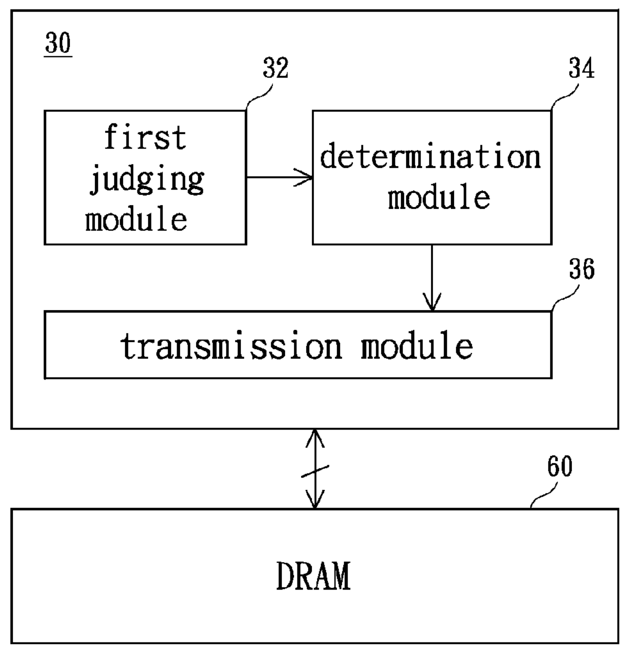
FIG. 3 is a block diagram of a controller according to an embodiment of the present invention.

FIG. 3 shows a block diagram of a controller for a DRAM according to an embodiment of the present invention. A controller 30, for controlling a DRAM 60, comprises a first judging module 32, a determination module 34 and a transmission module 36. In practice, the controller 30 may comprise other circuit elements not shown in FIG. 3. The first judging module 32 judges an address content difference between a first command and a third command. The determination module 34 determines a buffering address content of a second command according to the address different content. After the determination module 34 determines the buffering address content of the second command, the transmission module 36 sequentially transmits the first command, the second command and the third command to the DRAM 60. Operations of the controller 30 are as described with reference to FIG. 1, and shall be omitted for brevity.

Figure 4:
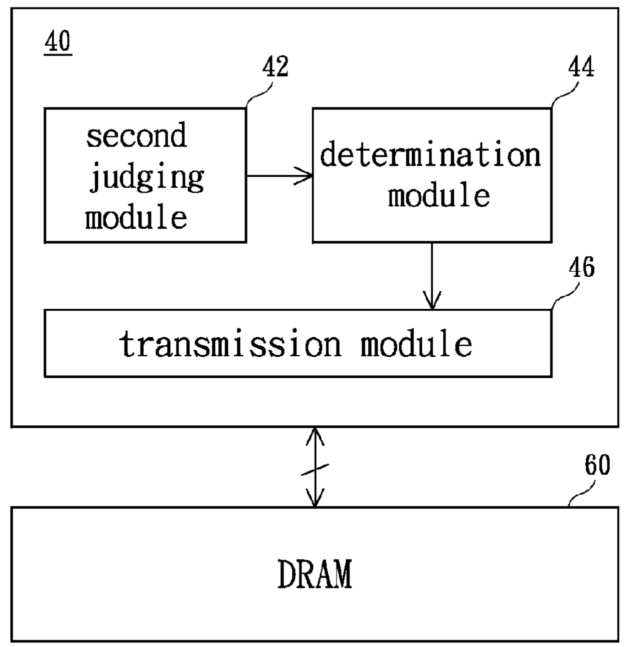
FIG. 4 is a block diagram of a controller according to another embodiment of the present invention.

FIG. 4 shows a block diagram of a controller for a DRAM according to another embodiment of the present invention. A controller 40, for controller a DRAM 60, comprises a second judging module 42, a determination module 44 and a transmission module 46. In practice, the controller 40 may comprise other circuit elements not shown in FIG. 4. The second judging module 42 judges whether an address content difference between a first command and a third command is greater than a predetermined threshold. When the address content difference is greater than the predetermined threshold, the determination module 44 determines a buffering address content of a second command according to the address content difference. After the determination module 44 determines the buffering address content of the second command, the transmission module 46 sequentially transmits the first command, the second command and the third command to the DRAM 60. Conversely, when the address content difference is smaller than the predetermined threshold, the transmission module 46 directly transmits the first command and the third command to the DRAM 60 in sequence. Operations of the controller 40 are as described with reference to FIG. 2, and shall be omitted for brevity.

Therefore, through an appropriate arrangement of command contents and command sequence transmitted to a DRAM, the method and controller of the present invention is capable of reducing the number of concurrent toggles on signal lines to lower corresponding noise interference to lower noise and at the same time increase stability of signal transmission. Thus, an electronic device applying the method and controller of the present invention can operate at a higher speed without increasing shields of an expensive printed circuit board, so as to reinforce durability of the electronic device operating at a higher system speed and reducing cost of a printed circuit board.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A control method for a dynamic random access memory (DRAM), comprising:

judging an address content difference between a first command and a third command;

determining a plurality of buffering address contents, associated with at least one second command, according to the address content difference; and sequentially transmitting the first command, the at least one second command and the third command to the DRAM;

wherein, each of the first command and the third command is a first-type command, and the at least one second command is a second-type command.

2. The control method according to claim 1, wherein the first-type command is a command capable of utilizing all address content bits, and the second-type command is a command utilizing partial or none of address content bits.

3. The control method according to claim 2, wherein the command capable of utilizing all address content bits comprises a mode register set (MRS) command, an ACTIVE command, a WRITE command or a READ command, the command utilizing partial or none of the address content bits comprises an update command, a no operation (NOP) command or a PRECHARGE command.

4. The control method according to claim 1, wherein determining the plurality of buffering address contents comprises referencing a configuration of signal lines associated with the DRAM or a configuration of power lines to determine the buffering address contents.

5. The control method according to claim 1, wherein a transmission sequence and contents of the first command, the second command and the third command comply with specifications of DRAM.

6. A control method for a dynamic random access memory (DRAM), comprising:

identifying whether an address content difference between a first command and a third command is greater than a predetermined threshold;

determining a plurality of buffering address contents, associated with at least one second command, according to the address content difference when the address content difference is greater than the predetermined threshold; and sequentially transmitting the first command, the second command and the third command to the DRAM;

wherein, each of the first command and the third command is a first-type command, and the at least one second command is a second-type command.

7. The control method according to claim 6, further comprising:

sequentially transmitting the first command and the third command to the DRAM when the address content difference is smaller than the predetermined threshold.

8. The control method according to claim 6, wherein the first-type command is a command capable of utilizing all address content bits, and the second-type command is a command utilizing partial or none of the address content bits.

9. The control method according to claim 8, wherein the command utilizing all address content bits comprises a mode register set (MRS) command, an ACTIVE command, a WRITE command or a READ command, the command utilizing partial or none of the address content bits comprises an update command, a no operation (NOP) command or a PRECHARGE command.

10. The control method according to claim 6, wherein the determining step determines the plurality of buffering address contents of at the least one second command according to the address content difference when the address content difference is greater than the predetermined threshold by referencing a configuration of signal lines associated with the DRAM or a configuration of power lines.

11. The control method according to claim 6, wherein a transmission sequence and transmitted contents of the first command, the second command and the third command comply with specifications of DRAM.

12. A controller for a DRAM, comprising:

a judging module, for judging an address content difference between a first command and a third command;

a determination module, for determining a plurality of buffer address contents, associated with at least one second command, according to the address content difference; and a transmission module, for sequentially transmitting the first command, the at least one second command and the third command to the DRAM;

wherein, each of the first command and the third command is a first-type command, and the at least one second command is a second-type command.

13. The controller according to claim 12, wherein the first-type command is a command capable of utilizing all address content bits, and the second-type command is a command utilizing partial or none of the address content bits.

14. The controller according to claim 13, wherein the command utilizing all address content bits comprises a mode register set (MRS) command, an ACTIVE command, a WRITE command or a READ command, the command utilizing partial or none of the address content bits comprises an update command, a no operation (NOP) command or a PRECHARGE command.

15. The controller according to claim 12, wherein the determining module determines the plurality of buffering address contents of at the least one second command according to the address content difference by referencing a configuration of signal lines associated with the DRAM or a configuration of power lines.

16. The controller according to claim 12, wherein the judging module further comprises a predetermined threshold and identifies whether the address content difference is greater than the predetermined threshold.

17. The controller according to claim 16, wherein the determining module determines the plurality of buffering address contents of the at least one second command when the address content difference is greater than the predetermined threshold.

18. The controller according to claim 16, wherein the transmitting module sequentially transmits the first command and the third command to the DRAM when the address content difference is smaller than the predetermined threshold.

19. The controller according to claim 16, wherein the first-type command is a command utilizing all address content bits, and the second-type command is a command utilizing partial or none of the address content bits.

20. The controller according to claim 16, wherein the determining module determines the plurality of buffering address contents by further referencing a configuration of signal lines associated with the DRAM or a configuration of power lines.

* * * * *